(No Model.)
G. W. MILTIMORE.
CAR WHEEL.
No. 347,950. Patented Aug. 24, 1886.
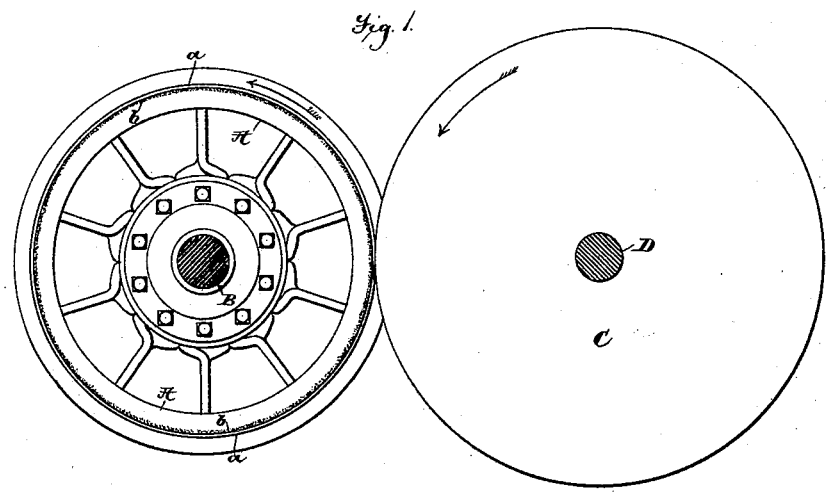
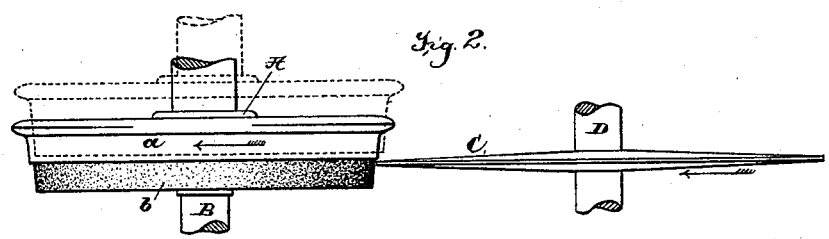
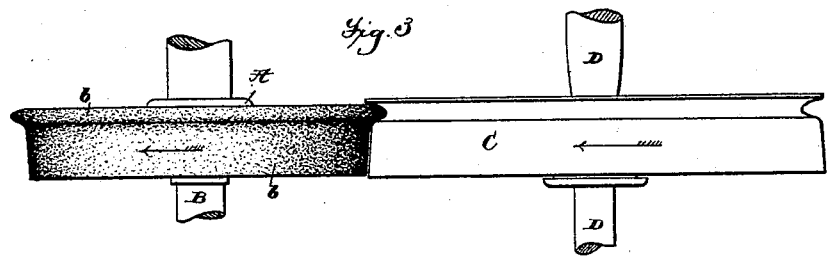
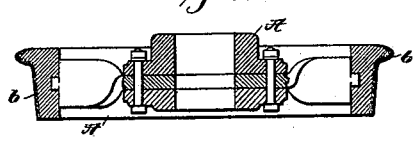
Attest:
Geo. H. Botts
Jas. J. Kennedy
Inventor:
George W. Miltimore
by Munson & Philipp
his Attys.
N. PETERS, Photo-Lithographer, Washington, D. C.

UNITED STATES PATENT OFFICE.

GEORGE W. MILTIMORE, OF ARLINGTON, VT., ASSIGNOR TO THE UNITED STATES CAR WHEEL DRESSING COMPANY, OF CHICAGO, ILL.

CAR-WHEEL.

SPECIFICATION forming part of Letters Patent No. 347,950, dated August 24, 1886.

Application filed March 26, 1886. Serial No. 196,688. (No model.)

*To all whom it may concern:*

Be it known that I, GEORGE W. MILTIMORE, a citizen of the United States, residing at Arlington, county of Bennington, and State of Vermont, have invented certain new and useful Improvements in Car-Wheels, fully described and represented in the following specification and the accompanying drawings, forming a part of the same.

In constructing wheels for use upon railway cars and locomotives it is highly desirable that the tread of the wheel, or that portion which comes into contact with the track-rails, should be provided with a hard surface, so as to be capable of resisting wear, while at the same time it is also important that the main part or body of the wheel should remain in a soft or comparatively soft condition, so as to be capable of withstanding the strain to which it is subjected and not be liable to crack by reason of cold. It is also very desirable that the tread of the wheel should be dressed or turned, so as to present a perfectly smooth and even surface and be in the form of a perfect circle.

The car and locomotive wheels in common use are principally of two classes—viz., those made of cast-iron and those made of steel or having a steel rim or tire. The wheels of the former class are provided with hard surfaces upon their treads and flanges by the process of chilling in the act of casting; but by this means their surfaces are rendered so hard that it has been found impracticable by any means heretofore known to dress them so as to make their treads and flanges smooth and uniform before they are put into use or to re dress them to restore them to the proper form after they have once been worn out of shape. From this it has resulted that these cast-iron wheels have heretofore been put into use in the comparatively rough condition in which they came from the molds, which is not desirable, and, furthermore, that whenever they became worn out of shape they could not be restored to proper form, and were consequently worthless except for old iron. In the wheels of the latter class—viz., those made of steel or having steel rims or tires—low-carbon steel is used, and the surfaces of the treads and flanges have not been hardened because no means have heretofore been known by which such a result could be practically and successfully accomplished. From this it has resulted that these steel wheels have been put into use in a soft or comparatively soft condition, and were consequently much less durable than they would have been had their treads or treads and flanges been provided with hardened surfaces.

It is the object of the present invention to produce car and locomotive wheels having perfectly-dressed and exceedingly hard surfaces upon their treads or treads and flanges, while the main part or body of the metal of which the wheel is composed remains in its original condition.

As a full understanding of the invention can be best imparted by a detailed description of the manner in which the wheel is treated to produce the characteristics stated, such description will be given, reference being had to the accompanying drawings, in which—

Figures 1 and 2 are respectively a side elevation and an edge view of a car-wheel, illustrating one manner of dressing and hardening its tread. Fig. 3 is a view similar to Fig. 2, illustrating a manner of dressing and hardening the tread and flange of the wheel; and Fig. 4 is a cross-section of the wheel, illustrating its hardened surface.

Referring to said drawings, it is to be understood that A represents a car-wheel of any of the ordinary constructions. In the case shown the wheel is of the construction shown and described in United States Letters Patent No. 261,944, consisting of a steel rim or tire and wrought-iron spokes; but this wheel has been selected merely for the purpose of illustration. The wheel shown is also of suitable size for a car or the trucks of a locomotive; but this is not material, as it may be of suitable size and form for a locomotive driving-wheel.

The wheel A is supported in any suitable manner, preferably upon its axle B, so that it can be revolved freely with its edge or periphery in close proximity to the edge or periphery of a disk or wheel, C, which is mounted upon a shaft, D, and is arranged to be revolved with great rapidity. The edge or periphery of the disk or wheel, as shown in Fig. 3, is made to form the counterpart of the tread and flange of the wheel A. The disk C having been set in motion, and having attained a velocity of from two thousand five hundred to three thousand revolutions per minute, (assuming the disk to be from thirty-five to forty-two inches in diameter,) the wheel A is revolved slowly in the same direction, as indicated by the arrows, and is at the same time moved slowly up to the disk. This operation being continued, and the speed of the disk maintained, the entire surface of the tread and flange of the wheel will be presented to the disk, and the original surface $a$ will be burned and melted away to a uniform depth, thus dressing the wheel down to the form of a perfect circle, and leaving a new surface, $b$, which is perfectly smooth and uniform and of great hardness, as indicated by the stippling. The main portion or body of the metal of which the wheel or tire is composed will, however, remain in its original condition.

The result will be the same, whether the wheel is made of chilled iron or of steel, except that the hardening effect will be more marked in the case of a steel wheel.

If it is desired to produce a wheel having only its tread dressed and hardened, the disk C may be made to form only the counterpart of the tread, and if it is desired to produce a wheel having only its flange dressed and hardened the disk may be made to form only the counterpart of the flange. So, also, the dressing and hardening of the tread may be effected, as illustrated in Figs. 1 and 2, in which case the disk C has a very narrow edge, the wheel being moved laterally in an oblique direction, as indicated in Fig. 2, at the same time that it is revolved, so that all portions of the surface of its tread will be presented to the disk.

The speed at which the disk C should be revolved will depend to some extent upon the character of the wheel. With a disk forty-two inches in diameter and revolved at the rate of three thousand revolutions per minute good results can be accomplished; but better results can be effected by revolving the disk at a higher rate of speed. The speed at which the wheel should be revolved will also depend to same extent upon its character. The best hardening effect will be produced by revolving the wheel quite quickly—say ten or twelve revolutions per minute—and moving it up to the disk quite slowly, so that only a small amount of metal will be dressed off at each revolution of the wheel. The hardening effect can be increased by applying water to the dressed surface of the wheel as it leaves the disk.

Wheels having dressed and hardened surfaces herein described can be produced by treating new wheels before they have been put into use, or by treating old wheels which have been so worn out of shape by use as to be utterly worthless, except for old iron.

The wheels treated in the manner described are readily distinguishable from ordinary wheels, both by the smooth and perfect finish of their treads or treads and flanges and by the exceeding hardness of the dressed surface.

For a full description and illustration of a mechanism operating in the manner described in connection with Figs. 1 and 2, reference is made to my prior applications for Letters Patent filed March 13, 1885, No. 158,679, and February 19, 1886, No. 192,490, and for a full description of a mechanism operating in the manner described, in connection with Fig. 3, reference is made to my prior applications for Letters Patent filed February 19, 1886, No. 192,490, and March 11, 1886, No. 194,812.

The method of dressing and hardening the surfaces of metal bodies herein described is not herein claimed, as the same is claimed in my prior application, No. 192,490, before referred to.

What I claim is—

1. A car or locomotive wheel having its tread or tread and flange dressed by burning and melting away the original surface by means of a rapidly revolving disk or wheel, substantially as described.

2. A car or locomotive wheel having its tread or tread and flange dressed and hardened by burning and melting away the original surface by means of a rapidly-revolving disk or wheel, substantially as described.

3. A car or locomotive wheel made of steel or having a steel rim or tire, and having its tread or tread and flange dressed and hardened, substantially as described.

In testimony whereof I have hereunto set my hand in the presence of two subscribing witnesses.

GEORGE W. MILTIMORE.

Witnesses:
HARMON C. BROWNSON,
JAMES W. LISCOMB.